United States Patent
Rajput et al.

(10) Patent No.: US 11,895,080 B2
(45) Date of Patent: Feb. 6, 2024

(54) METHODS, SYSTEMS, AND COMPUTER READABLE MEDIA FOR RESOLUTION OF INTER-NETWORK DOMAIN NAMES

(71) Applicant: Oracle International Corporation, Redwood Shores, CA (US)

(72) Inventors: Jay Rajput, Bangalore (IN); Virendra Singh, Bangalore (IN); Ankit Srivastava, Uttar Pradesh (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 250 days.

(21) Appl. No.: 17/356,451

(22) Filed: Jun. 23, 2021

(65) Prior Publication Data
US 2022/0417204 A1    Dec. 29, 2022

(51) Int. Cl.
*H04L 61/103*    (2022.01)
*H04L 41/12*    (2022.01)
*H04L 67/56*    (2022.01)

(52) U.S. Cl.
CPC .......... *H04L 61/103* (2013.01); *H04L 41/12* (2013.01); *H04L 67/56* (2022.05)

(58) Field of Classification Search
CPC ... H04L 41/12; H04L 61/103; H04L 61/4511; H04L 63/0281; H04L 67/56; H04W 8/00; H04W 8/02; H04W 88/182
See application file for complete search history.

(56) References Cited

U.S. PATENT DOCUMENTS

| | | | |
|---|---|---|---|
| 5,381,413 A | 1/1995 | Tobagi et al. |
| 6,014,558 A | 1/2000 | Thomas |
| 6,119,000 A | 9/2000 | Stephenson et al. |
| 6,725,278 B1 | 4/2004 | Gonzalez |
| 6,748,435 B1 | 6/2004 | Wang et al. |
| 7,151,945 B2 | 12/2006 | Myles et al. |

(Continued)

FOREIGN PATENT DOCUMENTS

| | | |
|---|---|---|
| CN | 101366311 A | 2/2009 |
| CN | 101512971 A | 8/2009 |

(Continued)

OTHER PUBLICATIONS

Office Action for Japanese Application No. 2021-523374 dated Mar. 14, 2023.

(Continued)

*Primary Examiner* — Gil H. Lee
(74) *Attorney, Agent, or Firm* — Jenkins, Taylor & Hunt, P.A.

(57) ABSTRACT

A method for resolution of inter-network domain names between telecommunications networks includes storing, at a security edge protection proxy (SEPP) of a home network, a mapping between a domain name and a network address of a producer network function of the home network. The method includes receiving, at the SEPP of the home network, a request message from a consumer network function of a visitor network. The method includes resolving, at the SEPP of the home network, a request message domain name of the request message using the mapping between the domain name and the network address of the producer network function of the home network.

16 Claims, 4 Drawing Sheets

(56) References Cited

U.S. PATENT DOCUMENTS

| | | |
|---|---|---|
| 7,535,915 B2 | 5/2009 | Collins |
| 7,706,822 B2 | 4/2010 | Emeott et al. |
| 7,782,776 B2 | 8/2010 | Shankar et al. |
| 8,023,482 B2 | 9/2011 | Gong et al. |
| 8,300,637 B1 | 10/2012 | Bennett, III et al. |
| 8,306,034 B2 | 11/2012 | Jang et al. |
| 8,620,858 B2 | 12/2013 | Backholm et al. |
| 8,645,565 B2 | 2/2014 | Sparks et al. |
| 8,767,705 B2 | 7/2014 | Göppner et al. |
| 8,811,228 B2 | 8/2014 | Lopez et al. |
| 8,811,372 B2 | 8/2014 | Li et al. |
| 8,824,449 B2 | 9/2014 | van der Wateren et al. |
| 8,879,431 B2 | 11/2014 | Ridel et al. |
| 8,954,080 B2 | 2/2015 | Janakiraman et al. |
| 9,124,537 B2 | 9/2015 | Kolze |
| 9,246,762 B1 | 1/2016 | Watkins |
| 9,386,551 B2 | 7/2016 | Zhou et al. |
| 9,667,590 B2 | 5/2017 | Yan et al. |
| 9,730,156 B1 | 8/2017 | Chamarty et al. |
| 9,781,259 B1 | 10/2017 | Kodaypak |
| 9,893,939 B2 | 2/2018 | Kim et al. |
| 9,894,464 B2 | 2/2018 | Jain et al. |
| 9,948,646 B1 | 4/2018 | Lai et al. |
| 10,097,504 B2 | 10/2018 | Backholm |
| 10,104,567 B2 | 10/2018 | Kodaypak |
| 10,129,867 B2 | 11/2018 | Shaw et al. |
| 10,194,459 B2 | 1/2019 | Kim et al. |
| 10,212,639 B2 | 2/2019 | Kodaypak |
| 10,231,113 B1 | 3/2019 | Huang et al. |
| 10,285,155 B1 | 5/2019 | Dodd-Noble et al. |
| 10,299,128 B1 | 5/2019 | Suthar et al. |
| 10,313,362 B2 | 6/2019 | Ahuja et al. |
| 10,313,914 B2 | 6/2019 | Huang et al. |
| 10,361,843 B1 | 7/2019 | Suthar et al. |
| 10,375,530 B2 | 8/2019 | Buckley et al. |
| 10,375,548 B2 | 8/2019 | Kodaypak et al. |
| 10,448,243 B2 | 10/2019 | Tanna |
| 10,470,077 B1 | 11/2019 | Kodaypak et al. |
| 10,517,138 B2 | 12/2019 | Starsinic et al. |
| 10,536,211 B2 | 1/2020 | Leroux |
| 10,542,459 B2 | 1/2020 | Hua et al. |
| 10,548,000 B2 | 1/2020 | Jain et al. |
| 10,548,062 B2 | 1/2020 | Cui et al. |
| 10,555,202 B1 | 2/2020 | Narayanan et al. |
| 10,575,278 B2 | 2/2020 | Kim et al. |
| 10,581,623 B2 | 3/2020 | Lu et al. |
| 10,588,085 B2 | 3/2020 | Kim et al. |
| 10,595,256 B1 | 3/2020 | Marupaduga et al. |
| 10,595,268 B2 | 3/2020 | Lee et al. |
| 10,601,932 B2 | 3/2020 | Kodaypak et al. |
| 10,602,322 B2 | 3/2020 | Palanisamy et al. |
| 10,602,441 B2 | 3/2020 | Palanisamy et al. |
| 10,609,154 B2 | 3/2020 | Talebi Fard et al. |
| 10,609,530 B1 | 3/2020 | Patil et al. |
| 10,616,934 B2 | 4/2020 | Talebi Fard et al. |
| 10,623,161 B2 | 4/2020 | Åström et al. |
| 10,631,266 B2 | 4/2020 | Park et al. |
| 10,637,753 B1 | 4/2020 | Taft et al. |
| 10,652,085 B2 | 5/2020 | Ryu et al. |
| 10,652,098 B2 | 5/2020 | Kim |
| 10,742,744 B1 | 8/2020 | Mahalank et al. |
| 10,772,062 B1 | 9/2020 | Albasheir et al. |
| 10,778,527 B2 | 9/2020 | Assali et al. |
| 10,791,044 B1 | 9/2020 | Krishan et al. |
| 10,791,508 B2 | 9/2020 | Park et al. |
| 10,805,036 B2 | 10/2020 | Ronneke et al. |
| 10,805,178 B2 | 10/2020 | Livanos et al. |
| 10,805,841 B2 | 10/2020 | Livanos et al. |
| 10,819,636 B1 | 10/2020 | Goel |
| 10,820,231 B2 | 10/2020 | Huang et al. |
| 10,833,938 B1 | 11/2020 | Rajput et al. |
| 10,880,370 B2 | 12/2020 | Seenappa et al. |
| 10,945,120 B2 | 3/2021 | Gupta et al. |
| 10,972,368 B2 | 4/2021 | Sapra et al. |
| 11,082,393 B2 | 8/2021 | Goel |
| 11,109,307 B2 | 8/2021 | Bartolome Rodrigo et al. |
| 11,159,359 B2 | 10/2021 | Goel |
| 11,224,009 B2 | 1/2022 | Krishan |
| 11,271,846 B2 | 3/2022 | Krishan |
| 11,290,549 B2 | 3/2022 | Krishan |
| 11,323,413 B2 | 5/2022 | Goel |
| 11,470,544 B2 | 10/2022 | Singh et al. |
| 11,483,694 B2 | 10/2022 | Krishan |
| 11,528,334 B2 | 12/2022 | Krishan |
| 11,570,262 B2 | 1/2023 | Sapra et al. |
| 2003/0174649 A1 | 9/2003 | Shankar et al. |
| 2003/0223414 A1 | 12/2003 | Wong |
| 2004/0003069 A1 | 1/2004 | Wong |
| 2004/0062278 A1 | 4/2004 | Hadzic et al. |
| 2004/0141473 A1 | 7/2004 | Buot |
| 2004/0203744 A1 | 10/2004 | Hicks et al. |
| 2004/0208183 A1 | 10/2004 | Balachandran et al. |
| 2005/0193096 A1 | 9/2005 | Yu et al. |
| 2005/0232407 A1 | 10/2005 | Craig et al. |
| 2006/0010224 A1 | 1/2006 | Sekar et al. |
| 2007/0050331 A1 | 3/2007 | Bauman et al. |
| 2007/0242738 A1 | 10/2007 | Park et al. |
| 2008/0039132 A1 | 2/2008 | Delibie et al. |
| 2008/0165761 A1 | 7/2008 | Goppner et al. |
| 2009/0006652 A1 | 1/2009 | Kasatani |
| 2009/0024727 A1 | 1/2009 | Jeon et al. |
| 2009/0055835 A1 | 2/2009 | Zhu |
| 2009/0141625 A1 | 6/2009 | Ghai et al. |
| 2009/0222584 A1 | 9/2009 | Josefsberg et al. |
| 2010/0029301 A1 | 2/2010 | Pyo et al. |
| 2010/0118847 A1 | 5/2010 | Lee et al. |
| 2011/0078674 A1 | 3/2011 | Ershov |
| 2011/0202604 A1 | 8/2011 | Craig et al. |
| 2012/0320766 A1 | 12/2012 | Sridhar |
| 2013/0029708 A1 | 1/2013 | Fox et al. |
| 2013/0039176 A1 | 2/2013 | Kanode et al. |
| 2013/0198269 A1 | 8/2013 | Fleischman et al. |
| 2013/0272123 A1 | 10/2013 | Lee et al. |
| 2014/0040975 A1 | 2/2014 | Raleigh et al. |
| 2014/0075004 A1 | 3/2014 | Van Dusen et al. |
| 2014/0189151 A1 | 7/2014 | Aviv et al. |
| 2014/0379901 A1 | 12/2014 | Tseitlin et al. |
| 2015/0016266 A1 | 1/2015 | Dumitrescu et al. |
| 2015/0039560 A1 | 2/2015 | Barker et al. |
| 2015/0071074 A1 | 3/2015 | Zaidi et al. |
| 2015/0110000 A1 | 4/2015 | Zhang et al. |
| 2015/0263987 A1 | 9/2015 | Klein et al. |
| 2016/0142324 A1 | 5/2016 | Vihtari et al. |
| 2016/0156513 A1 | 6/2016 | Zhang et al. |
| 2016/0164788 A1 | 6/2016 | Goel et al. |
| 2016/0183156 A1 | 6/2016 | Chin et al. |
| 2016/0234119 A1 | 8/2016 | Zaidi et al. |
| 2016/0315743 A1 | 10/2016 | Nagaraj et al. |
| 2016/0330647 A1 | 11/2016 | Iwai |
| 2016/0344635 A1 | 11/2016 | Lee et al. |
| 2016/0350683 A1 | 12/2016 | Bester et al. |
| 2016/0352588 A1 | 12/2016 | Subbarayan et al. |
| 2016/0373591 A1 | 12/2016 | Sharma et al. |
| 2016/0380906 A1 | 12/2016 | Hodique et al. |
| 2017/0077751 A1 | 3/2017 | Forbes |
| 2017/0187673 A1 | 6/2017 | Kaliski, Jr. et al. |
| 2017/0195822 A1 | 7/2017 | Watfa et al. |
| 2017/0221015 A1 | 8/2017 | June et al. |
| 2017/0244629 A1 | 8/2017 | Kodaypak et al. |
| 2017/0347283 A1 | 11/2017 | Kodaypak |
| 2018/0035351 A1 | 2/2018 | Kodaypak |
| 2018/0039494 A1 | 2/2018 | Lander et al. |
| 2018/0083882 A1 | 3/2018 | Krishan et al. |
| 2018/0159780 A1 | 6/2018 | Essigmann et al. |
| 2018/0183724 A1 | 6/2018 | Callard et al. |
| 2018/0205637 A1 | 7/2018 | Li |
| 2018/0206093 A1 | 7/2018 | Jain et al. |
| 2018/0213391 A1 | 7/2018 | Inoue |
| 2018/0213991 A1 | 8/2018 | Youk et al. |
| 2018/0230556 A1 | 8/2018 | Patterson |
| 2018/0249281 A1 | 8/2018 | McCann |
| 2018/0262592 A1 | 9/2018 | Zandi et al. |
| 2018/0262625 A1 | 9/2018 | McCarley et al. |
| 2018/0263013 A1 | 9/2018 | Jain et al. |

(56) References Cited

U.S. PATENT DOCUMENTS

| | | |
|---|---|---|
| 2018/0285794 A1 | 10/2018 | Gray-Donald et al. |
| 2018/0324247 A1 | 11/2018 | Hood et al. |
| 2018/0324646 A1 | 11/2018 | Lee et al. |
| 2018/0324671 A1 | 11/2018 | Palnati et al. |
| 2018/0332462 A1 | 11/2018 | Kim et al. |
| 2018/0343567 A1 | 11/2018 | Ashrafi |
| 2018/0376417 A1 | 12/2018 | Wang |
| 2019/0007329 A1 | 1/2019 | Velev et al. |
| 2019/0007366 A1 | 1/2019 | Voegele et al. |
| 2019/0028337 A1 | 1/2019 | Ryu et al. |
| 2019/0036871 A1 | 1/2019 | Lapidous et al. |
| 2019/0037441 A1 | 1/2019 | Liu et al. |
| 2019/0045351 A1 | 2/2019 | Zee et al. |
| 2019/0069211 A1 | 2/2019 | Ronneke et al. |
| 2019/0069221 A1 | 2/2019 | Virgile et al. |
| 2019/0075552 A1 | 3/2019 | Yu et al. |
| 2019/0116486 A1 | 4/2019 | Kim et al. |
| 2019/0116521 A1 | 4/2019 | Qiao et al. |
| 2019/0140895 A1 | 5/2019 | Ennis, Jr. et al. |
| 2019/0141527 A1 | 5/2019 | Krishan |
| 2019/0158364 A1 | 5/2019 | Zhang et al. |
| 2019/0173740 A1 | 6/2019 | Zhang et al. |
| 2019/0174561 A1 | 6/2019 | Sivavakeesar |
| 2019/0182875 A1 | 6/2019 | Talebi Fard et al. |
| 2019/0191274 A1 | 6/2019 | Fontaine |
| 2019/0191348 A1 | 6/2019 | Futaki et al. |
| 2019/0191467 A1 | 6/2019 | Dao et al. |
| 2019/0222633 A1 | 7/2019 | Howes et al. |
| 2019/0223093 A1 | 7/2019 | Watfa et al. |
| 2019/0230492 A1 | 7/2019 | Suzuki et al. |
| 2019/0230556 A1 | 7/2019 | Lee |
| 2019/0238425 A1 | 8/2019 | Mladin et al. |
| 2019/0238642 A1 | 8/2019 | Sesham et al. |
| 2019/0253461 A1* | 8/2019 | Bykampadi ......... H04L 63/0209 |
| 2019/0253875 A1 | 8/2019 | Vittal |
| 2019/0261244 A1 | 8/2019 | Jung et al. |
| 2019/0268270 A1 | 8/2019 | Fattah |
| 2019/0306251 A1 | 10/2019 | Talebi Fard et al. |
| 2019/0306907 A1 | 10/2019 | Andreoli-Fang et al. |
| 2019/0313236 A1 | 10/2019 | Lee et al. |
| 2019/0313437 A1 | 10/2019 | Jung et al. |
| 2019/0313469 A1 | 10/2019 | Karampatsis et al. |
| 2019/0335002 A1 | 10/2019 | Bogineni et al. |
| 2019/0335534 A1 | 10/2019 | Atarius et al. |
| 2019/0342229 A1 | 11/2019 | Khinvasara et al. |
| 2019/0342921 A1 | 11/2019 | Loehr et al. |
| 2019/0349426 A1 | 11/2019 | Smith et al. |
| 2019/0349901 A1 | 11/2019 | Basu Mallick et al. |
| 2019/0357092 A1 | 11/2019 | Jung et al. |
| 2019/0380031 A1 | 12/2019 | Suthar et al. |
| 2019/0387460 A1 | 12/2019 | Jonnala et al. |
| 2019/0394284 A1 | 12/2019 | Baghel et al. |
| 2019/0394624 A1 | 12/2019 | Karampatsis et al. |
| 2019/0394833 A1 | 12/2019 | Talebi Fard et al. |
| 2020/0007632 A1 | 1/2020 | Landais et al. |
| 2020/0008069 A1 | 1/2020 | Zhu et al. |
| 2020/0021953 A1 | 1/2020 | Mahalank |
| 2020/0028920 A1 | 1/2020 | Livanos et al. |
| 2020/0028973 A1 | 1/2020 | Livanos et al. |
| 2020/0029197 A1 | 1/2020 | Tandon et al. |
| 2020/0037203 A1 | 1/2020 | Lanev et al. |
| 2020/0037226 A1 | 1/2020 | Magadevan |
| 2020/0045753 A1 | 2/2020 | Dao et al. |
| 2020/0045767 A1 | 2/2020 | Velev et al. |
| 2020/0053628 A1 | 2/2020 | Wang et al. |
| 2020/0053670 A1 | 2/2020 | Jung et al. |
| 2020/0053686 A1 | 2/2020 | Edge et al. |
| 2020/0053724 A1 | 2/2020 | MolavianJazi et al. |
| 2020/0053802 A1 | 2/2020 | Li et al. |
| 2020/0053828 A1 | 2/2020 | Bharatia et al. |
| 2020/0059420 A1 | 2/2020 | Abraham |
| 2020/0059856 A1 | 2/2020 | Cui et al. |
| 2020/0059927 A1 | 2/2020 | Sun et al. |
| 2020/0068047 A1 | 2/2020 | Huang et al. |
| 2020/0068626 A1 | 2/2020 | Cakulev et al. |
| 2020/0076764 A1 | 3/2020 | Robitzsch et al. |
| 2020/0077253 A1 | 3/2020 | Kim et al. |
| 2020/0077361 A1 | 3/2020 | Huang et al. |
| 2020/0084277 A1 | 3/2020 | Somaraju |
| 2020/0084663 A1 | 3/2020 | Park et al. |
| 2020/0084677 A1 | 3/2020 | Yiu et al. |
| 2020/0092423 A1 | 3/2020 | Qiao et al. |
| 2020/0092424 A1 | 3/2020 | Qiao et al. |
| 2020/0092706 A1 | 3/2020 | Kawasaki et al. |
| 2020/0100080 A1 | 3/2020 | Mladin et al. |
| 2020/0100088 A1 | 3/2020 | Kim et al. |
| 2020/0100291 A1 | 3/2020 | Ravishankar et al. |
| 2020/0106695 A1 | 4/2020 | Rk et al. |
| 2020/0106812 A1 | 4/2020 | Verma et al. |
| 2020/0120475 A1 | 4/2020 | Gupta |
| 2020/0120478 A1 | 4/2020 | Kim |
| 2020/0127916 A1 | 4/2020 | Krishan |
| 2020/0128566 A1 | 4/2020 | Wei et al. |
| 2020/0136911 A1 | 4/2020 | Assali et al. |
| 2020/0137174 A1 | 4/2020 | Stammers et al. |
| 2020/0137675 A1 | 4/2020 | Park et al. |
| 2020/0145309 A1 | 5/2020 | Soderlund |
| 2020/0146077 A1 | 5/2020 | Li et al. |
| 2020/0177629 A1 | 6/2020 | Hooda et al. |
| 2020/0229265 A1 | 7/2020 | Wang et al. |
| 2020/0275257 A1 | 8/2020 | Gupta et al. |
| 2020/0296665 A1 | 9/2020 | Huang et al. |
| 2020/0305033 A1 | 9/2020 | Keller et al. |
| 2020/0313996 A1 | 10/2020 | Krishan et al. |
| 2020/0314615 A1 | 10/2020 | Patil et al. |
| 2020/0314760 A1 | 10/2020 | Ye et al. |
| 2020/0322884 A1 | 10/2020 | Di Girolamo et al. |
| 2020/0336554 A1 | 10/2020 | Deshpande et al. |
| 2020/0344576 A1 | 10/2020 | Li et al. |
| 2020/0366577 A1 | 11/2020 | Sapra et al. |
| 2020/0404608 A1 | 12/2020 | Albasheir et al. |
| 2020/0412597 A1 | 12/2020 | Goel et al. |
| 2021/0000723 A1 | 1/2021 | Strand et al. |
| 2021/0007023 A1 | 1/2021 | Umapathy et al. |
| 2021/0044481 A1 | 2/2021 | Xu et al. |
| 2021/0067480 A1 | 3/2021 | Goel |
| 2021/0067485 A1 | 3/2021 | Goel |
| 2021/0076248 A1 | 3/2021 | Kallam et al. |
| 2021/0105214 A1 | 4/2021 | Goel |
| 2021/0136602 A1 | 5/2021 | Pokkunuri et al. |
| 2021/0168055 A1 | 6/2021 | Lair |
| 2021/0204200 A1 | 7/2021 | Krishan et al. |
| 2021/0235254 A1 | 7/2021 | Farooq |
| 2021/0273977 A1 | 9/2021 | Karasaridis et al. |
| 2021/0274392 A1 | 9/2021 | Dao et al. |
| 2021/0297935 A1* | 9/2021 | Belling .................. H04L 45/00 |
| 2021/0367916 A1 | 11/2021 | Belling et al. |
| 2021/0385286 A1 | 12/2021 | Wang et al. |
| 2021/0385732 A1 | 12/2021 | Reyes et al. |
| 2022/0015023 A1 | 1/2022 | De-Gregorio-Rodriguez et al. |
| 2022/0038545 A1 | 2/2022 | Krishan |
| 2022/0060547 A1 | 2/2022 | Krishan |
| 2022/0131945 A1 | 4/2022 | Sapra et al. |
| 2022/0240171 A1 | 7/2022 | Singh |
| 2022/0330004 A1* | 10/2022 | Sood ...................... H04L 67/56 |
| 2023/0042219 A1 | 2/2023 | Singh et al. |
| 2023/0090068 A1 | 3/2023 | Rajput et al. |
| 2023/0099468 A1 | 3/2023 | Khare et al. |

FOREIGN PATENT DOCUMENTS

| | | |
|---|---|---|
| CN | 105635345 B | 2/2019 |
| CN | 109788078 A | 5/2019 |
| CN | 114930902 A | 8/2022 |
| CN | ZL201980067968.7 | 9/2022 |
| CN | 202080023004.5 | 4/2023 |
| CN | 2020800910053 | 5/2023 |
| EP | 2 575 303 A1 | 4/2013 |
| EP | 4022875 A1 | 7/2022 |
| WO | WO 2017/143915 A1 | 8/2017 |
| WO | WO 2018/174021 A1 | 9/2018 |
| WO | WO 2018/174516 A1 | 9/2018 |
| WO | WO 2019/034609 A1 | 2/2019 |
| WO | WO 2019/062596 A1 | 4/2019 |

(56) References Cited

FOREIGN PATENT DOCUMENTS

| WO | WO 2019/076273 A1 | 4/2019 |
| WO | WO 2019/144321 A1 | 8/2019 |
| WO | WO 2019/220172 A1 | 11/2019 |
| WO | WO 2020/091934 A1 | 5/2020 |
| WO | WO 2020/171899 A1 | 8/2020 |
| WO | WO 2020/176172 A1 | 9/2020 |
| WO | WO 2020/210026 A1 | 10/2020 |
| WO | WO 2020/263486 A1 | 12/2020 |
| WO | WO 2021/040827 A1 | 3/2021 |
| WO | WO 2021/055998 A1 | 3/2021 |
| WO | WO 2021/138074 A1 | 7/2021 |
| WO | WO 2022/025987 A1 | 2/2022 |
| WO | WO 2022/093319 A1 | 5/2022 |

OTHER PUBLICATIONS

Notification to Grant Patent Rights for Chinese Patent Application Serial No. 202080091005.3 (dated Feb. 25, 2023).

Communication of European Publication Number and Information on the Application of Article 67(3) EPC for European Patent Application Serial No. 20842464.8 (dated Oct. 12, 2022).

First Examination Report for Indian Patent Application Serial No. 202247036246 (dated Nov. 17, 2022).

Notice of Allowance and Fee(s) Due for U.S. Appl. No. 17/082,871 (dated Sep. 28, 2022).

Notification to Grant Patent Right for Chinese Patent Application Serial No. 201980067968.7 (dated Aug. 25, 2022).

Notice of Allowance and Fee(s) Due for U.S. Appl. No. 16/945,794 (dated Aug. 2, 2022).

Notification of the First Office Action for Chinese Patent Application Serial No. 202080023004.5 (dated Jul. 4, 2022).

Notice of Publication for European Patent Application Serial No. 20733169.5 (dated Jun. 9, 2022).

Notice of Allowance for U.S. Appl. No. 17/009,725 (dated Jun. 13, 2022).

Final Office Action for U.S. Appl. No. 17/082,871 (dated Jun. 6, 2022).

Notice of Allowance for U.S. Appl. No. 17/156,149 (dated May 24, 2022).

Advisory Action and Examiner-Initiated Interview Summary for U.S. Appl. No. 16/945,794 (dated May 20, 2022).

Notice of Allowance for U.S. Appl. No. 17/156,149 (dated Apr. 19, 2022).

Communication of European Publication No. and Information on the Application of Article 67(3) EPC for European Patent Application Serial No. 20732441.9 (dated Apr. 6, 2022).

Non-Final Office Action for Chinese Patent Application Serial No. 201980067968.7 (dated Mar. 3, 2022).

First Examination Report for Indian Patent Application Serial No. 202147011137 (dated Mar. 9, 2022).

Final Office Action for U.S. Appl. No. 16/945,794 (dated Feb. 8, 2022).

Non-Final Office Action for U.S. Appl. No. 17/082,871 (dated Feb. 7, 2022).

Commonly-assigned, co-pending U.S. Appl. No. 17/497,879 for "Methods, Systems, and Computer Readable Media for Routing Inter-Public Land Mobile Network (Inter-PLMN) Messages Related to Existing Subscriptions with Network Function (NF) Repository Function (NRF) Using Security Edge Protection Proxy (SEPP)" (Unpublished, filed Oct. 21, 2021).

Commonly-assigned, co-pending U.S. Appl. No. 17/481,004 for Methods, Systems, and Computer Readable Media for Providing for Optimized Service-Bases Interface (SBI) Communications by Preforming Network Function (NF) Fully Qualified Domain Name (FQDN) Resolution at NF Repository Function (NRF) (Unpublished, filed Oct. 1, 2021).

Commonly-Assigned, co-pending U.S. Appl. No. 17/543,989 for "Methods, Systems, and Computer Readable Media for Dynamic Adjustment to Network Function Profile for Discovery Responses" (Unpublished, filed Dec. 17, 2021).

Notice of Allowance and Fee(s) Due for U.S. Appl. No. 17/074,553 (dated Dec. 29, 2021).

Notice of Allowance and Fee(s) Due for U.S. Appl. No. 17/001,599 (dated Nov. 17, 2021).

Notice of Allowance and Fee(s) Due for U.S. Appl. No. 17/102,404 (dated Oct. 7, 2021).

Notification of Transmittal of the International Search Report and the Written Opinion of the International Searching Authority, or the Declaration for International Application No. PCT/US2021/033031 (dated Sep. 16, 2021).

"3rd Generation Partnership Project; Technical Specification Group Services and System Aspects; Security architecture and procedures for 5G system (Release 17)," 3GPP TS 33.501, V17.3.0, pp. 1-258 (Sep. 2021).

"3rd Generation Partnership Project; Technical Specification Group Core Network and Terminals; 5G System; Network Function Repository Services; Stage 3 (Release 17)," 3GPP TS CN, V17.3.0, pp. 1-271 (Sep. 2021).

"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

Notice of Allowance and Fee(s) Due for U.S. Appl. No. 16/356,446 (dated Sep. 30, 2021).

"Implementing Quality of Service Policies with DSCP," Cisco, pp. 1-7 (Feb. 15, 2008).

Mockapetris, "Domain Names—Implementation and Specification," Network Working Group, Request for Comments 1035, pp. 1-55 (Nov. 1987).

First Examination Report for European Patent Application Serial No. 19 791 391.6 1213 (dated Dec. 16, 2022).

Notification to Grant for Chinese Patent Application Serial No. 202080023004.5 (dated Jan. 29, 2023).

First Examination Report for Indian Patent Application Serial No. 202147053057 (dated Dec. 30, 2022).

First Examination Report for Indian Patent Application Serial No. 202147036462 (dated Dec. 29, 2022).

Non-Final Office Action for U.S. Appl. No. 16/945,794 (dated Sep. 15, 2021).

Non-Final Office Action for U.S. Appl. No. 17/481,004 (dated Jun. 7, 2023).

Notice of Publication for European Patent Application No. 21713526.8 (dated May 10, 2023).

Intention to Grant for European Patent Application 20 838 308.3 (dated Apr. 19, 2023).

Intent to Grant for European Patent Application No. 20733169.5 (dated Jun. 9, 2023).

Notice of Publication for European Patent Application No. 21718460.5 (dated Jun. 14, 2023).

Notice of Publication for European Patent Application No. 21714723.0 (dated Jun. 1, 2023).

Non-Final Office Action for U.S. Appl. No. 17/074,553 (dated Aug. 18, 2021).

Notice of Allowance and Fee(s) Due for U.S. Appl. No. 16/730,799 (dated Aug. 16, 2021).

Communication of European publication No. and information on the application of Article 67(3) EPC for European Patent Application Serial No. 19791391.6 (dated Aug. 11, 2021).

Commonly-Assigned, co-pending U.S. Appl. No. 17/392,288 for "Methods, Systems, and Computer Readable Media for Optimized Routing of Service Based Interface (SBI) Request Messages to Remote Network Function (NF) Repository Functions Using Indirect Communications via Service Communications Proxy (SCP)" (Unpublished, filed Aug. 3, 2021).

Notice of Allowance and Fee(s) Due for U.S. Appl. No. 16/730,799 (dated Jul. 30, 2021).

(56) References Cited

OTHER PUBLICATIONS

Notification of Transmittal of the International Search Report and the Written Opinion of the International Searching Authority, or the Declaration for International Application No. PCT/US2021/024000 (dated Jun. 24, 2021).
Notification of Transmittal of the International Search Report and the Written Opinion of the International Searching Authority, or the Declaration for U.S. Patent Application Serial No. PCT/US2021/020120 (dated Jun. 1, 2021).
Notification of Transmittal of the International Search Report and the Written Opinion of the International Searching Authority, or the Declaration for U.S. Patent Application Serial No. PCT/US2021/020122 (dated Jun. 1, 2021).
"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).
"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).
"3rd Generation Partnership Project; Technical Specification Group Core Network and Terminals; Numbering, addressing and identification; (Release 17)," 3GPP TS 23.003, V17.1.0, pp. 1-143 (Mar. 2021).
"3rd Generation Partnership Project; Technical Specification Group Core Network and Terminals; 5G System; Public Land Mobile Network (PLMN) Interconnection; Stage 3 (Release 17)," 3GPP TS 29.573, V17.0.0, pp. 1-100 (Mar. 2021).
Nokia et al., "Discussion paper on authorization for Model D Indirect communications", 3GPP TSG SA WG3; S3-194380 (Nov. 11, 2019).
Notice of Allowance and Fee(s) Due for U.S. Appl. No. 16/697,021 (dated Jun. 21, 2021).
Non-Final Office Action for U.S. Appl. No. 16/356,446 (dated Jun. 16, 2021).
Notice of Publication for International Application Serial No. PCT/US2020/061885 (dated Jun. 3, 2021).
Notice of Allowance and Fee(s) Due for U.S. Appl. No. 17/001,599 (dated May 17, 2021).
Advisory Action for U.S. Appl. No. 16/697,021 (dated May 7, 2021).
Applicant-Initiated Interview Summary for U.S. Appl. No. 17/001,599 (dated May 5, 2021).
Notification of Transmittal of the International Search Report and the Written Opinion of the International Searching Authority, or the Declaration for International Application Serial No. PCT/US2020/065765 (dated Apr. 15, 2021).
Ex Parte Quayle Action for U.S. Appl. No. 16/730,799 (Apr. 7, 2021).
Notice of Allowance and Fee(s) Due for U.S. Appl. No. 16/555,817 (dated Mar. 24, 2021).
International Search Report and Written Opinion for Patent Cooperation Treaty Application Serial No. PCT/US2020/061885 (dated Feb. 4, 2021).
International Search Report and Written Opinion for Patent Cooperation Treaty Application Serial No. PCT/US2020/057712 (dated Feb. 2, 2021).
Cheshire, S. et al., "Apple's DNS Long-Lived Queries protocol draft-sekar-dns-llq-06," Internet Engineering Task Force (IETF), pp. 1-26 (Aug. 23, 2019).
Final Office Action for U.S. Appl. No. 16/697,021 (dated Feb. 2, 2021).
Applicant-Initiated Interview Summary for U.S. Appl. No. 16/697,021 (dated Jan. 26, 2021).
"3rd Generation Partnership Project; Technical Specification Group Services and System Aspects; Procedures for the 5G System (5GS); Stage 2 (Release 16)," 3GPP TS 23.502, V16.7.0, pp. 1-603 (Dec. 2020).
"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).
"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).
"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).
Advisory Action for U.S. Appl. No. 16/356,446 (dated Dec. 22, 2020).
Notice of Allowance and Fee(s) Due for U.S. Appl. No. 16/555,817 (dated Dec. 3, 2020).
Notice of Allowance and Fee(s) Due for U.S. Appl. No. 16/415,758 (dated Dec. 2, 2020).
Commonly-Assigned, co-pending U.S. Continuation-in-Part U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances," (Unpublished, filed Nov. 23, 2020).
Commonly-Assigned, co-pending U.S. Appl. No. 17/156,149 for "Methods, Systems, and Computer Readable Media for Optimized Routing of Messages Relating to Existing Network Function (NF) Subscriptions Using an Intermediate Forwarding NF Repository Function (NRF)," (Unpublished, filed Nov. 9, 2020).
Notice of Allowance and Fee(s) Due for U.S. Appl. No. 16/287,808 (dated Nov. 4, 2020).
Commonly-Assigned, co-pending U.S. Appl. No. 17/082,871 for "Methods, Systems, and Computer Readable Media for Rank Processing for Network Function Selection," (Unpublished, filed Oct. 28, 2020).
Applicant-Initiated Interview Summary for U.S. Appl. No. 16/415,758 (dated Oct. 20, 2020).
Commonly-Assigned, co-pending U.S. Continuation-in-Part U.S. Appl. No. 17/074,553 for "Methods, Systems, and Computer Readable Media for Actively Discovering and Tracking Addresses Associated with 4G Service Endpoints," (Unpublished, filed Oct. 19, 2020).
"p. GW Administration Guide, StarOS Release 21.20," Cisco, pp. 1-1164 (Oct. 11, 2020).
Commonly-Assigned, co-pending U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances," (Unpublished, filed Sep. 23, 2020).
"3rd Generation Partnership Project; Technical Specification Group Core Network and Terminals; Non-Access-Stratum (NAS) protocol for Evolved Packet System (EPS); Stage 3 (Release 17)," 3GPP TS 24.301, V17.0.0, pp. 1-585 (Sep. 2020).
3rd Generation Partnership Project; Technical Specification Group Services and System Aspects; Architecture enhancements to facilitate communications with packet data networks and applications (Release 16), 3GPP TS 23.682, V16.8.0, pp. 1-135 (Sep. 2020).
Non-Final Office Action for U.S. Appl. No. 16/697,021 (dated Sep. 29, 2020).
Notice of Allowance and Fee(s) Due for U.S. Appl. No. 16/527,988 (dated Sep. 17, 2020).
Final Office Action for U.S. Appl. No. 16/356,446 (dated Sep. 8, 2020).
Commonly-Assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).
Notice of Allowance and Fee(s) Due and Examiner-Initiated Interview Summary for U.S. Appl. No. 16/453,955 (dated Aug. 26, 2020).
Commonly-Assigned, co-pending U.S. Appl. No. 17/001,599 for "Methods, Systems, and Computer Readable Media for Optimized

(56) References Cited

OTHER PUBLICATIONS

Network Function (NF) Discovery and Routing Using Service Communications Proxy (SCP) And NF Repository Function (NRF)," (Unpublished, filed Aug. 24, 2020).
Notification of the Transmittal of the International Search Report and the Written Opinion of the International Searching Authority, or the Declaration for International Application No. PCT/US2020/ 034723 (dated Aug. 17, 2020).
Non-Final Office Action for U.S. Appl. No. 16/555,817 (dated Aug. 7, 2020).
"3rd Generation Partnership Project; Technical Specification Group Services and System Aspects; System architecture for the 5G System (5GS); Stage 2 (Release 16)," 3GPP Ts 23.501 V16.5.1, pp. 1-440 (Aug. 2020).
Commonly-Assigned, co-pending U.S. Appl. No. 16/945,794 for "Methods, Systems, And Computer Readable Media For Preferred Network Function (NF) Location Routing Using Service Communications Proxy (SCP)," (Unpublished, filed Jul. 31, 2020).
Commonly-Assigned, co-pending U.S. Appl. No. 16/932,226 for "Methods, Systems, and Computer Readable Media for Monitoring Machine Type Communications (MTC) Device Related Information," (Unpublished, filed Jul. 17, 2020).
Notification of Transmittal of the International Search Report and the Written Opinion of the International Searching Authority, or the Declaration for International Application Serial No. PCT/US2020/ 024518 (dated Jul. 10, 2020).
Notification of Transmittal of the International Search Report and the Written Opinion of the International Searching Authority, or the Declaration for International Application Serial No. PCT/US2020/ 035004 (dated Jul. 7, 2020).
"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).
"3rd Generation Partnership Project; Technical Specification Group Core Network and Terminals; Location Services (LCS); Diameter-based SLh interface for Control Plane LCS (Release 16)," 3GPP TS 29.173 V16.0.0, pp. 1-19 (Jul. 2020).
"3rd Generation Partnership Project; Technical Specification Group Services and System Aspects; Architecture enhancements to facilitate communications with packet data networks and applications (Release 16)," 3GPP Ts 23.682 V16.7.0, pp. 1-134 (Jul. 2020).
Non-Final Office Action for U.S. Appl. No. 16/287,808 (dated Jun. 16, 2020).
Ex Parte Quayle Action for U.S. Appl. No. 16/527,988 (Jun. 1, 2020).
"3rd Generation Partnership Project; Technical Specification Group Core Network and Terminals; Home Subscriber Server (HSS) diameter interfaces for interworking with packet data networks and applications (Release 16)," 3GPP TS 29.336 V16.2.0, pp. 1-79 (Jun. 2020).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272 V16.3.0, pp. 1-177 (Jun. 2020).
"3rd Generation Partnership Project; Technical Specification Group Core Network and Terminals; T8 reference point for Northbound APIs; (Release 16)," 3GPP TS 29.122 V16.6.0, pp. 1-360 (Jun. 2020) ..........
"3rd Generation Partnership Project; Technical Specification Group Core Network and Terminals; 5G System; Technical Realization of Service Based Architecture; Stage 3 (Release 16)," 3GPP TS 29.500 V16.4.0 pp. 1-79 (Jun. 2020).
Non-Final Office Action for U.S. Appl. No. 16/415,758 (dated May 26, 2020).
Notice of Allowance and Fee(s) Due for U.S. Appl. No. 16/369,691 (dated May 12, 2020).
Non-Final Office Action for U.S. Appl. No. 16/356,446 (dated May 11, 2020).

Notification of Transmittal of the International Search Report and the Written Opinion of the International Searching Authority, or the Declaration for International Application Serial No. PCT/US2020/ 013960 (dated Apr. 20, 2020).
Notice of Allowance and Fee(s) Due for U.S. Appl. No. 16/176,920 (dated Apr. 16, 2020).
Notice of Allowance and Fee(s) Due for U.S. Appl. No. 16/399,428 (dated Apr. 6, 2020).
Applicant-Initiated Interview Summary for U.S. Appl. No. 16/176,920 (dated Apr. 1, 2020).
Notification of Transmittal of the International Search Report and the Written Opinion of the International Searching Authority, or the Declaration for International Application Serial No. PCT/US2020/ 013961 (dated Mar. 31, 2020).
Non-Final Office Action for U.S. Appl. No. 16/176,920 (dated Mar. 6, 2020).
"3rd Generation Partnership Project; Technical Specification Group Core Network and Terminals; Mobility Management Entity (MME) and Serving GPRS Support Node (SGSN) interfaces for interworking with packet data networks and applications (Release 16)," 3GPP TS 29.128 V16.1.0, pp. 1-51 (Mar. 2020).
"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).
"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).
Commonly-Assigned, co-pending International Application Serial No. PCT/US20/13961 for "Methods, Systems, and Computer Readable Media for Dynamically Provisioning and Using Public Land Mobile Network (PLMN) Location Mappings in Service Capability Exposure Function (SCEF) or Network Exposure Function (NEF)," (Unpublished, filed Jan. 16, 2020).
Commonly-Assigned, co-pending International Application Serial No. PCT/US20/13960 for "Methods, Systems, and Computer Readable Media for Monitoring Internet of Things (IoT) Device State Through Service Capability Exposure Function (SCEF)," (Unpublished, filed Jan. 16, 2020).
"Oracle® Communications Diameter Signaling Router Service Capability Exposure Function User's Guide," Release 8.4, F12301-02, Oracle, pp. 1-150 (Jan. 2020).
Notification of Transmittal of the International Search Report and the Written Opinion of the International Searching Authority, or the Declaration for International Application Serial No. PCT/US2019/ 053912 (dated Dec. 18, 2019).
Commonly-Assigned, co-pending U.S. Appl. No. 16/697,021 for "Methods, Systems, and Computer Readable Media for Diameter-Peer-Wide Egress Rate Limiting at Diameter Relay Agent (DRA)," (Unpublished, filed Nov. 27, 2019).
"5G; System architecture for the 5G System (5GS) (3GPP TS 23.501 version 15.6.0 Release 15)," ETSI TS 123 501, V15.6.0, pp. 1-168 (Oct. 2019).
"5G; 5G System; Network function repository services; Stage 3 (3GPP TS 29.510 version 15.5.1 Release 15)," ETSI TS 129 510, V15.5.1, pp. 1-132 (Oct. 2019).
"3rd Generation Partnership Project; Technical Specification Group Core Network and Terminals; 5G Systems; Network Function Repository Services; Stage 3 (Release 16)," 3GPP TS 29.510 V.16.1.1, pp. 1-150 (Oct. 2019).
Notice of Allowance and Fee(s) Due for U.S. Appl. No. 16/280,672 (dated Sep. 25, 2019).
"3rd Generation Partnership Project; Technical Specification Group Core Network and Terminals; 5G System; Technical Realization of Service Based Architecture; Stage 3 (Release 16)," 3GPP TS 29.500 V16.1.0, pp. 1-43 (Sep. 2019).
"3rd Generation Partnership Project; Technical Specification Group Service and System Aspects; System Architecture for the 5G System (5GS); Stage 2 (Release 16)," 3GPP TS 23.501 V16.2.0, pp. 1-391 (Sep. 2019).
"3rd Generation Partnership Project; Technical Specification Group Services and System Aspects; Architecture enhancements to facili-

(56) References Cited

OTHER PUBLICATIONS tate communications with packet data networks and applications (Release 16)," 3GPP TS 23.682, V16.4.0, pp. 1-30 (Sep. 2019).
"5G; 5G System; Technical Realization of Service Based Architecture; Stage 3 (3GPP TS 29.500 version 15.5.0 Release 15)," ETSI TS 129 500, V15.5.0, pp. 1-40 (Sep. 2019).
Cheshire et al., "Apple's DNS Long-Lived Queries protocol," Network Working Group, Apple, Inc., pp. 1-26 (Aug. 22, 2019).
"Diameter and Diameter Applications," Alcatel-Lucent, http://infodoc.alcatel-lucent.com/html/0_add-h-f/93-0098-HTML/7750_SR_OS_Triple_Play_Guide/GX-PolicyMgmt.html, pp. 1-40 (Aug. 22, 2019).
Commonly-Assigned, co-pending U.S. Appl. No. 16/527,988 for "Methods, Systems, and Computer Readable Media for Network Function (NF) Topology Synchronization," (Unpublished, filed Jul. 31, 2019).
"3rd Generation Partnership Project; Technical Specification Group Radio Access Network; NG-RAN; NG Application Protocol (NGAP) (Release 15)," 3GPP TS 38.413, V15.4.0, pp. 1-328 (Jul. 2019).
Commonly-Assigned, co-pending U.S. Appl. No. 16/453,955 for "Methods, Systems, and Computer Readable Media for Producer Network Function (NF) Service Instance Wide Egress Rate Limiting at Service Communication Proxy (SCP)," (Unpublished, filed Jun. 26, 2019).
"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).
"3rd Generation Partnership Project; Technical Specification Group Core Network and Terminals; 5G System; Network Function Repository Services; Stage 3 (Release 15)," 3GPP TS 29.510, V15.4.0, pp. 1-127 (Jun. 2019).
"3rd Generation Partnership Project; Technical Specification Group Core Network and Terminals; 5G System; Restoration Procedures (Release 16)," 3GPP TS 23.527, V16.0.0, pp. 1-19 (Jun. 2019).
"3rd Generation Partnership Project; Technical Specification Group Core Network and Terminals; Numbering, addressing and identification (Release 15)," 3GPP TS 23.003, V15.7.0, pp. 1-131 (Jun. 2019).
Commonly-Assigned, co-pending U.S. Appl. No. 16/415,758 for "Methods, Systems, and Computer Readable Media for Providing Reduced Signaling Internet of Things (Iot) Device Monitoring," (Unpublished, filed May 17, 2019).
Commonly-Assigned, co-pending U.S. Appl. No. 16/399,428 for "Methods, Systems, and Computer Readable Media for Monitoring Lightweight Machine to Machine (LWM2M) Internet of Things (IoT) Devices Through Service Capability Exposure Function (SCEF) T8 Interface," (Unpublished, filed Apr. 30, 2019).
Huawei, "eSBA: reselection of producer instance," 3GPP TSG-SA2 Meeting #132, pp. 1-2 (Apr. 12, 2019).
"Class of Service Feature Guide (Routers and EX9200 Switches)," Junos® OS, Juniper Networks, pp. 1-1530 (Apr. 10, 2019).
Commonly-Assigned, co-pending U.S. Appl. No. 16/369,691 for "Methods, System, and Computer Readable Media for Handling Multiple Versions of Same Service Provided by Producer Network Functions (NFs)," (Unpublished, filed Mar. 29, 2019).
Commonly-Assigned, co-pending U.S. Appl. No. 16/356,446 for "Methods, Systems, and Computer Readable Media for Locality-Based Selection and Routing of Traffic TO Producer Network Functions (NFs)," (Unpublished, filed Mar. 18, 2019).
"3rd Generation Partnership Project; Technical Specification Group Services and System Aspects; System Architecture and 5G; Stage 2 (Release 16)," 3GPP TS 23.501, V16.0.0, pp. 1-318 (Mar. 2019).
"3rd Generation Partnership Project; Technical Specification Group Core Network and Terminals; Home Subscriber Server (HSS) diameter interfaces for interworking with packet data networks and applications (Release 15)," 3GPP TS 29.336, V15.6.0, pp. 1-79 (Mar. 2019).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 15)," 3GPP TS 29.272, V15.7.0, pp. 1-179 (Mar. 2019).
"3rd Generation Partnership Project; Technical Specification Group Services and System Aspects; Architecture enhancements to facilitate communications with packet data networks and applications (Release 16)," 3GPP TS 23.682, V16.2.0, pp. 1-126 (Mar. 2019).
"3rd Generation Partnership Project; Technical Specification Group Core Network and Terminals; T8 reference point for Northbound APIs; (Release 16)," 3GPP TS 29.122, V16.1.0, pp. 1-288 (Mar. 2019).
Commonly-Assigned, co-pending U.S. Appl. No. 16/287,808 for "Methods, Systems, and Computer Readable Media for Dynamically Provisioning and Using Public Land Mobile Network (PLMN) Location Mappings in Service Capability Exposure Function (SCEF) or Network Exposure Function (NEF)," (Unpublished, filed Feb. 27, 2019).
Commonly-Assigned, co-pending U.S. Appl. No. 16/280,672 for "Methods, Systems, And Computer Readable Media for (IoT) Device State Through Service Capability Exposure Function (SCEF)," (Unpublished, filed Feb. 20, 2019).
Penttinen, "5G Explained: Security and Deployment of Advanced Mobile Communications," Chapter 6, Section 6.3.8 NRF, 2 pages (Feb. 2019).
"OMA Lightweight Machine to Machine Requirements," Candidate Version 1.2, Open Mobile Alliance, pp. 1-20 (Jan. 24, 2019).
"3rd Generation Partnership Project; Technical Specification Group Services and System Aspects; Architecture enhancements to facilitate communications with packet data networks and applications (Release 16)," 3GPP TS 23.682, V16.1.0, pp. 1-126 (Dec. 2018).
"Oracle Communications Diameter Signaling Router," Release Notice, Release 8.3, E93179 Revision 02, Oracle, pp. 1-98 (Dec. 2018).
"3rd Generation Partnership Project; Technical Specification Group Radio Access Network; Evolved Universal Terrestrial Radio Access Network (E-Utran); S1 Application Protocol (S1AP) (Release 15)," 3GPP TS 36.413, V15.4.0, pp. 1-383 (Dec. 2018).
"3rd Generation Partnership Project; Technical Specification Group Network and Terminals; 5G Systems; Network Function Repository Services; Stage 3 (Release 15)," 3GPP TS 29.510, V15.2.0, pp. 1-113 (Dec. 2018).
"3rd Generation Partnership Project; Technical Specification Group Network and Terminals; 5G Systems; Principles and Guidelines for Services Definition; Stage 3 (Release 15)," 3GPP TS 29.501, V15.2.0, pp. 1-66 (Dec. 2018).
"3rd Generation Partnership Project; Technical Specification Group Core Network and Terminals; Home Subscriber Server (HSS) diameter interfaces for interworking with packet data networks and applications (Release 15)," 3GPP TS 29.336, V15.5.0, pp. 1-74 (Dec. 2018).
"3rd Generation Partnership Project; Technical Specification Group Core Network and Terminals; Mobility Management Entity (MME) and Serving GPRS Support Node (SGSN) interfaces for interworking with packet data networks and applications (Release 15)," 3GPP TS 29.128, V15.4.0, pp. 1-52 (Dec. 2018).
"3rd Generation Partnership Project; Technical Specification Group Core Network and Terminals; T8 reference point for Northbound APIs; (Release 15)," 3GPP TS 29.122, V15.2.0, pp. 1-297 (Dec. 2018).
"3rd Generation Partnership Project; Technical Specification Group Core Network and Terminals; Mobile Application Part (MAP) specification (Release 15)," 3GPP TS 29.002, V15.4.0, pp. 1-1021 (Dec. 2018).
"3rd Generation Partnership Project; Technical Specification Group Services and System Aspects; Study on Enhancements to the Service-Based Architecture (Release 16)," 3GPP TR 23.742, V16.0.0, pp. 1-131 (Dec. 2018).
Commonly-Assigned, co-pending U.S. Appl. No. 16/176,920 for "Methods, Systems, and Computer Readable Media for Providing a Service Proxy Function in a Telecommunications Network Core Using a Service-Based Architecture," (Unpublished, filed Oct. 31, 2018).
"Addressing 5G Network Function Requirements," Intel® FPGAs and Intel PAC 5G QoS and IPSec Benchmarking, White Paper, pp. 1-8 (Oct. 2018).

(56) References Cited

OTHER PUBLICATIONS

"5G; 5G System; Network function repository services; Stage 3 (3GPP TS 29.510 version 15.1.0 Release 15)," ETSI TS 129 510, V15.1.0, pp. 1-87 (Oct. 2018).
"5G; 5G System; Unified Data Repository Services; Stage 3 (3GPP TS 29.504 version 15.1.0 Release 15)," ETSI TS 129 504, V15.1.0, pp. 1-26 (Oct. 2018).
"Diameter Signaling Router SCEF User's Guide," Release 8.3, E93572, Oracle® Communications, pp. 1-110 (Sep. 2018).
"3rd Generation Partnership Project; Technical Specification Group Services and System Aspects; Universal Geographical Area Description (GAD) (Release 15)," 3GPP TS 23.032, pp. 1-32 (Sep. 2018).
"CPS vDRA Configuration Guide," Release 18.3.0 (Restricted Release)(1), Cisco, pp. 1-130 (Sep. 14, 2018).
"How to Do Rate Limiting of Diameter Messages Using NetScaler," Citrix Systems Inc., pp. 1-3 (Sep. 4, 2018).
"Lightweight Machine to Machine Technical Specification: Transport Bindings," Approved Version: 1.1, Open Mobile Alliance, pp. 1-68 (Aug. 6, 2018).
"5G; 5G System; Technical Realization of Service Based Architecture; Stage 3 (3GPP TS 29.500 version 15.0.0 Release 15)," ETSI TS 129 500, V15.0.0, pp. 1-29 (Jul. 2018).
"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).
"Universal Mobile Telecommunications System (UMTS); LTE; Tsp interface protocol between the MTC Interworking Function (MTC-IWF) and Service Capability Server (SCS)," 3GPP TS 29.368, V15.0.0, pp. 1-35 (Jul. 2018).
"3rd Generation Partnership Project; Technical Specification Group Radio Access Network; Evolved Universal Terrestrial Radio Access Network (E-UTRAN); S1 signalling transport (Release 15)," 3GPP TS 36.412, V15.0.0, pp. 1-8 (Jun. 2018).
"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).
"5G; Procedures for the 5G System (3GPP TS 23.502 version 15.2.0 Release 15)," ETSI TS 123 502 V15.2.0, pp. 1-46 (Jun. 2018).
"3rd Generation Partnership Project; Technical Specification Group Core Network and Terminals; Customised Applications for Mobile network Enhanced Logic (CAMEL) Phase 4; Stage 2 (Release 15)," 3GPP TS 23.078, V15.0.0, pp. 1-750 (Jun. 2018).
"Lightweight Machine to Machine Technical Specification: Transport Bindings," Candidate Version: 1.1, Open Mobile Alliance, pp. 1-67 (Jun. 12, 2018).
"Lightweight Machine to Machine Technical Specification: Core," Candidate Version: 1.1, Open Mobile Alliance, pp. 1-142 (Jun. 12, 2018).
Docomo, "Update Solution 4 for implicit registration," SA WG2 Meeting #129, pp. 1-2 (Oct. 15- 19, 2018).
"Cisco Ultra 5G Packet Core Solution," Cisco, White paper, https://www.cisco.com/c/dam/en/US/products/collateral/routers/network-convergence-system-500-series-routers/white-paper-c11-740360.pdf, pp. 1-11 (2018).
Li et al., "Mobile Edge Computing Platform Deployment in 4G LTE Networks: A Middlebox Approach," https://www.usenix.org/system/files/conference/hotedge18/hotedge18-papers-li.pdf, 6 pages (2018).
Mayer, "RESTful APIs for the 5G Service Based Architecture," Journal of ICT, vol. 6_1&2, pp. 101-116 (2018).
"5G Service Based Architecture (SBA)," 5G, pp. 1-61 (downloaded Dec. 24, 2018).
Scholl et al., "An API First Approach to Microservices Development," Oracle, https://blogs.oracle.com/developers/an-api-first-approach-to-microservices-development, pp. 1-12 (Nov. 8, 2017).
Mayer, Georg (Huawei), "3GPP 5G CoreNetwork Status," 3GPP a Global Initiative, pp. 1-23 (Nov. 2017).
Brown et al., "Service-Based Architecture for 5G Core Networks," Huawei, Heavy Reading, https://www.3g4g.co.uk/5G/5Gtech_6004_2017_11_Service-Based-Architecture-for-5G-Core-Networks_HR_Huawei.pdf, pp. 1-12 (Nov. 2017).
"3rd Generation Partnership Project; Technical Specification Group Services and System Aspects; System Architecture for the 5G System; Stage 2 (Release 15)," 3GPP TS 23.501, V1.5.0, pp. 1-170 (Nov. 2017).
"3rd Generation Partnership Project; Technical Specification Group Services and System Aspects; Architecture enhancements to facilitate communications with packet data networks and applications (Release 15)," 3GPP TS 23.682, V15.2.0, pp. 1-122 (Sep. 2017).
"Pseudo-CR on Service Discovery and Registration using NRF service," Ericsson, 3GPP TSG CT4 Meeting #79, 3GPP TR 29.891—v0.3.0, pp. 1-4 (Aug. 21-25, 2017).
Carlton et al., "HTTP and DNS in a 5G World," https://www.computerworld.com/article/3204594/http-and-dns-in-a-5g-world.html, pp. 1-5 (Jun. 30, 2017).
Benacer et al., "A High-Speed Traffic Manager Architecture for Flow-Based Networking," pp. 1-4 (2017).
Hoglund et al., "Overview of 3GPP Release 14 Enhanced NB-IoT," in IEEE Network, vol. 31, No. 6, pp. 16-22 (Nov./Dec. 2017).
Kafle et al., "Scalable Directory Service for IoT Applications," in IEEE Communications Standards Magazine, vol. 1, No. 3, pp. 58-65 (Sep. 2017).
Kouzayha et al., "Measurement-Based Signaling Management Strategies for Cellular IoT," in IEEE Internet of Things Journal, vol. 4, No. 5, pp. 1434-1444 (Oct. 2017).
Yu, "The Mobile Network Capability Exposure Friendly to the Mobile Internet Applications," 2017 IEEE Wireless Communications and Networking Conference (WCNC), pp. 1-6 (2017).
Bormann et al., "Block-Wise Transfers in the Constrained Application Protocol (CoAP)," RFC 7959, pp. 1-37 (Aug. 2016).
"Dynamically Reconfigurable Optical-Wireless Backhaul/Fronthaul with Cognitive Control Plane for Small Cells and Cloud-RANs: D3.1 Analysis of state of the art on scalable control plane design and techniques for user mobility awareness. Definition of 5G-XHaul control plane requirements," European Commission, 5G-XHaul, pp. 1-107 (Jun. 31, 2016).
"3rd Generation Partnership Project; Technical Specification Group Core Network and Terminals; Domain Name System Procedures; Stage 3 (Release 13)," 3GPP TS 29.303 V13.4.0, pp. 1-69 (Jun. 2016).
"3rd Generation Partnership Project; Technical Specification Group Services and System Aspects; Architecture enhancements to facilitate communications with packet data networks and applications (Release 13)," 3GPP TS 23.682, V13.6.0, pp. 1-91 (Jun. 2016).
"Multi-Layer Security Protection for Signaling Networks," Oracle Communications, Oracle white paper, pp. 1-9 (Jan. 2016).
Kantola et al., "Policy-based communications for 5G mobile with customer edge switching," Security and Communication Networks, vol. 9, pp. 3070-3082 (2016).
"3rd Generation Partnership Project; Technical Specification Group Services and System Aspects; Architecture enhancements to facilitate communications with packet data networks and applications (Release 13)," 3GPP TS 23.682, V13.4.0, pp. 1-81 (Dec. 2015).
Hartke, "Observing Resources in the Constrained Application Protocol (CoAP)," RFC 7641, pp. 1-30 (Sep. 2015).
ZTE, "Reporting the No. of UEs in Certain Geographic Area," SA WG2 Meeting #107, pp. 1-4 (Jan. 30, 2015).
Ratasuk et al., "Overview of LTE Enhancements for Cellular IoT," 2015 IEEE 26th International Symposium on Personal, Indoor and Mobile Radio Communications—(PIMRC): Workshop on M2M Communications: Challenges, Solutions and Applications, pp. 1-5 (2015).
Hawilo et al., "NFV: State of the Art, Challenges, and Implementation in Next Generation Mobile Networks (vEPC)," IEEE Network, pp. 1-9 (Nov./Dec. 2014).
Abdullah et al., "Femtocell Geo-location Challenge: DSL Approach as Solution," 2014 IEEE 5th Control and System Graduate Research Colloquium, pp. 239-241 (Aug. 11, 2014).
Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).

(56) References Cited

OTHER PUBLICATIONS

Shelby et al., "The Constrained Application Protocol (CoAP)," RFC 7252, pp. 1-112 (Jun. 2014).
Abley et al., "A Mechanism for Remote-Triggered DNS Cache Flushes (DNS FLUSH)," Network Working Group, Google, pp. 1-12 (Jun. 24, 2013).
Preston-Werner, "Semantic Versioning 2.0.0", Oracle, pp. 1-5 (Jun. 2013).
"LTE and Beyond," https://ytd2525.wordpress.com/2013/03/06/lte-and-beyond/, 3 pages (2013).
Fajardo et al., "Diameter Based Protocol," Internet Engineering Task Force (IETF) Request for Comments: 6733, pp. 1-152 (Oct. 2012).
China Mobile, "Supporting legacy HLR in Architecture for MTC usage," SA WG2 Meeting #90, pp. 1-9 (Apr. 10, 2012).
Le et al., "Cross-Layer Mobility Management based on Mobile IP and SIP in IMS," 2007 International Conference on Wireless Communications, Networking and Mobile Computing, pp. 803-806 (2007).
Bertrand, "The IP Multimedia Subsystem in Next Generation Networks" Network, Multimedia and Security Department (RSM), pp. 1-9 (May 30, 2007).
Faccin et al., "IP multimedia services: analysis of mobile IP and SIP interactions in 3G networks," in IEEE Communications Magazine, vol. 42, No. 1, pp. 113-120 (Jan. 2004).
Gulbrandsen et al., "A DNS RR for specifying the location of services (DNS SRV)," RFC 2782, pp. 1-12 (Feb. 2000).
Nichols et al., "Definition of the Differentiated Services Field (DS Field) in the IPv4 and IPV6 Headers," Internet Engineering Task Force (IETF) Network Working Group Request for Comments (RFC) 2474, The Internet Society, pp. 1-20 (Dec. 1998).
First Office Action for Chinese Patent Application Serial No. 202180052441.4 (dated Aug. 30, 2023).
Decision to Grant for European Patent Application Serial No. 20838308.3 (dated Aug. 31, 2023).
Notice of Publication for European Patent Application Serial No. 21731870.8 (dated Aug. 9, 2023).
Notice of Allowance and Fee(s) Due for U.S. Appl. No. 17/392,288 (dated Jul. 27, 2023).
Notice of Allowance for U.S. Appl. No. 17/497,879 (dated Jul. 26, 2023).
First Examination Report for Indian Patent Application Serial No. 202247065596 (dated May 30, 2023).
Intent to Grant for Japanese Patent Application No. 2021-523374 (dated Jun. 27, 2023).

\* cited by examiner

METHODS, SYSTEMS, AND COMPUTER READABLE MEDIA FOR RESOLUTION OF INTER-NETWORK DOMAIN NAMES

TECHNICAL FIELD

The subject matter described herein relates to communications between telecommunications networks. More particularly, the subject matter described herein relates to methods, systems, and computer readable media for resolution of inter-network domain names.

BACKGROUND

In fifth generation (5G) communications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF. In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destination producer NF instance.

The 3rd Generation Partnership Project (3GPP) mandates interPlmnFqdn to be used for inter public land mobile network (PLMN) routing (roaming scenarios) in 5G networks, which means an IP and interPlmnFqdn mapping is provided at a security edge protection proxy (SEPP) of the home network locally via DNS or other means, so that the home SEPP can route the 5G SBI request to the producer NF.

In light of these and other difficulties, there exists a need for methods, systems, and computer readable media for resolution of inter-network domain names.

SUMMARY

A method for resolution of inter-network domain names between telecommunications networks includes storing, at a security edge protection proxy (SEPP) of a home network, a mapping between a domain name and a network address of a producer network function of the home network. The method includes receiving, at the SEPP of the home network, a request message from a consumer network function of a visitor network. The method includes resolving, at the SEPP of the home network, a request message domain name of the request message using the mapping between the domain name and the network address of the producer network function of the home network.

According to another aspect of the subject matter described herein, the home network lacks a dedicated domain name service, and resolving the request message domain name includes resolving the request message domain name without accessing a domain name server.

According to another aspect of the subject matter described herein, storing the mapping between the domain name and the network address of the producer network function includes storing the mapping while acting as a proxy between the home network and the visitor network.

According to another aspect of the subject matter described herein, the acting as a proxy between the home network and the visitor network comprises receiving a discovery request from the consumer network function, forwarding the discovery request to a network function repository function (NRF), receiving a response message from the NRF, and forwarding the response message to the consumer network function.

According to another aspect of the subject matter described herein, storing the mapping between the domain name and the network address of the producer network function includes extracting the network address and domain name from the response message from the NRF.

According to another aspect of the subject matter described herein, storing the mapping between the domain name and the network address of the producer network function includes storing other topology information from a network function repository function (NRF), and resolving the request message domain name of the request message includes using the other topology information.

According to another aspect of the subject matter described herein, storing other topology information from the NRF includes extracting the other topology information from a subscription/notification request.

According to another aspect of the subject matter described herein, storing other topology information from the NRF includes extracting the other topology information from a network function management query.

According to another aspect of the subject matter described herein, the method includes forwarding the request message to the producer network function using the network address, receiving a response message from the producer network function, and forwarding the response message to the consumer network function.

According to another aspect of the subject matter described herein, the home network is a 5G network and the request message is a 5G service based interface (SBI) message.

According to another aspect of the subject matter described herein, a system for resolution of inter-network domain names between telecommunications networks includes at least one processor and a memory. The system further includes security edge protection proxy (SEPP) of a home network, the SEPP implemented by the at least one processor and configured for: storing a mapping between a domain name and a network address of a producer network function of the home network; receiving a request message from a consumer network function of a visitor network; and resolving a request message domain name of the request message using the mapping between the domain name and the network address of the producer network function of the home network.

According to another aspect of the subject matter described herein, the home network lacks a dedicated domain name service, and resolving the request message domain name includes resolving the request message domain name without accessing a domain name server.

According to another aspect of the subject matter described herein, storing the mapping between the domain name and the network address of the producer network function includes storing the mapping while acting as a proxy between the home network and the visitor network.

According to another aspect of the subject matter described herein, the acting as a proxy between the home network and the visitor network comprises receiving a discovery request from the consumer network function, forwarding the discovery request to a network function repository function (NRF), receiving a response message from the NRF, and forwarding the response message to the consumer network function.

According to another aspect of the subject matter described herein, storing the mapping between the domain name and the network address of the producer network function includes extracting the network address and domain name from the response message from the NRF.

According to another aspect of the subject matter described herein, storing the mapping between the domain name and the network address of the producer network function includes storing other topology information from a network function repository function (NRF), and resolving the request message domain name of the request message includes using the other topology information.

According to another aspect of the subject matter described herein, storing other topology information from the NRF includes extracting the other topology information from a subscription/notification request.

According to another aspect of the subject matter described herein, storing other topology information from the NRF includes extracting the other topology information from a network function management query.

According to another aspect of the subject matter described herein, the SEPP is configured for forwarding the request message to the producer network function using the network address, receiving a response message from the producer network function, and forwarding the response message to the consumer network function.

According to another aspect of the subject matter described herein, the home network is a 5G network and the request message is a 5G service based interface (SBI) message.

According to another aspect of the subject matter described herein, a non-transitory computer readable medium having stored thereon executable instructions that when executed by a processor of a computer control the computer to perform steps is provided. The steps include storing, at a security edge protection proxy (SEPP) of a home network, a mapping between a domain name and a network address of a producer network function of the home network; receiving, at the SEPP of the home network, a request message from a consumer network function of a visitor network; and resolving, at the SEPP of the home network, a request message domain name of the request message using the mapping between the domain name and the network address of the producer network function of the home network.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps.

Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for resolution of inter-network domain names between telecommunications networks.

In 5G telecommunications networks, the network node that provides service is referred to as a producer network function (NF). A network node that consumes services is referred to as a consumer NF. A network function can be both a producer NF and a consumer NF depending on whether it is consuming or providing service. An NF instance is an instance of a producer NF that provides a service. A given producer NF may include more than one NF instance.

The 3$^{rd}$ Generation Partnership Project (3GPP) mandates interPlmnFqdn to be used for inter public land mobile network (PLMN) routing (roaming scenarios) in 5G networks, which means an IP and interPlmnFqdn mapping is provided at a security edge protection proxy (SEPP) of the home network locally via DNS or other means, so that the home SEPP can route the 5G SBI request to the producer NF. In contrast, for intra-PLMN routing, the 5G network can be created as internet protocol (IP) only without any local configuration via domain name service (DNS) or other means (e.g., network function repository function (NRF) provides IP for the producer NFs).

An operator may choose to not use DNS in their network for any of various reasons, for example, to mitigate DNS related security attacks, simplify operations by configuring FQDN/IP mapping only in the NRF, frequently changing 5G topology making DNS not feasible or other reasons. Similarly, provisioning the FQDN IP mapping locally can be cumbersome from an operational standpoint. This specification describes methods and systems where the home security edge protection proxy (SEPP) can route 5G service based interface (SBI) requests to producer NFs in absence of local configuration of interPlmnFqdn to IP mapping.

Figure 1:
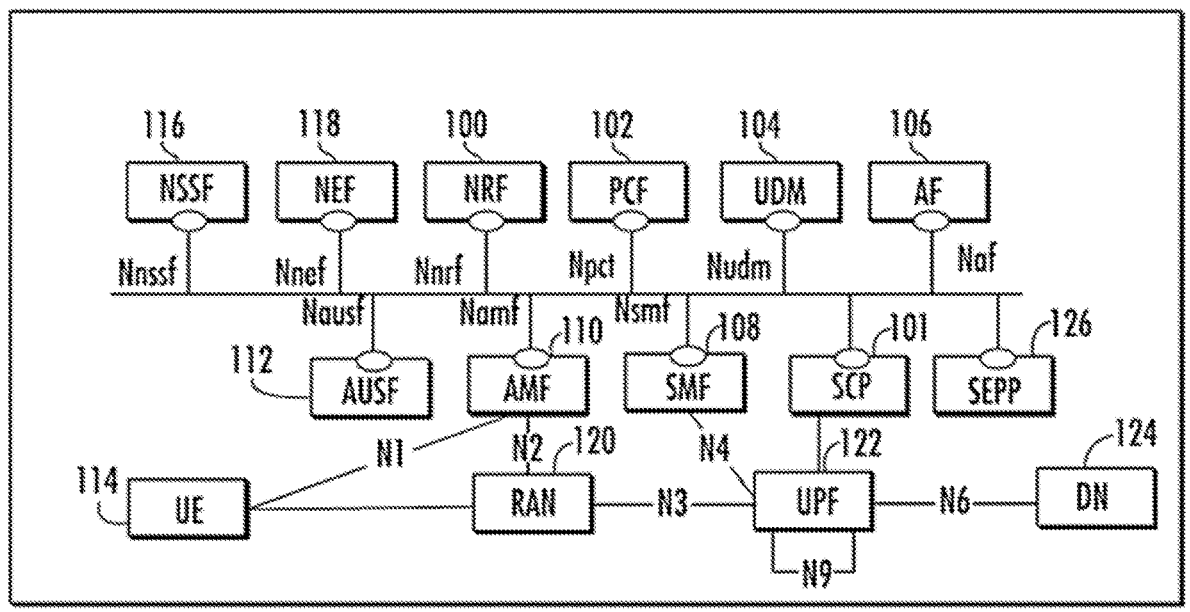
FIG. 1 is a block diagram illustrating an example 5G system network architecture.

FIG. 1 is a block diagram illustrating an example 5G system network architecture. The architecture in FIG. 1 includes NRF 100 and SCP 101, which may be located in the same home public land mobile network (HPLMN). NRF 100 may maintain profiles of available producer NF service instances and their supported services and allow consumer NFs or SCPs to subscribe to and be notified of the registration of new/updated producer NF service instances.

SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in 3GPP Technical Specification (TS) 29.510.

In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services.

The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality.

UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a visitor PLMN which manages security for the visitor PLMN. Thus, traffic between NFs in different PLMNs may traverse two SEPP functions, one for the home PLMN and the other for the visitor PLMN.

3GPP technical specification TS23003h00 section 28.5 describes network function FQDN format for inter-PLMN routing. 3GPP technical specification TS23003h00 section 28.5.1 mandates the FQDN of the target NF shall have the Home Network Domain. As a result of this requirement, FQDN is needed for inter PLMN routing at a visitor SEPP, V-SEPP. In particular, the specification states:

For routing HTTP/2 request messages to NF in a different PLMN, the FQDN of the target NF shall have the Home Network Domain (see clause 28.2) as the trailing part.

3GPP technical specification TS29.573g50 Annex C explains end to end flows when SEPP is on path. SEPP performs resolution of FQDN into an IP address using DNS. TCP/TLS connection for sending the HTTP/2 messages is initiated towards the IP address obtained from DNS resolution. In particular, the specification states:

Resolution of FQDN into an IP address using DNS. TCP/TLS connection for sending the HTTP/2 messages is initiated towards the IP address obtained from DNS resolution.

3GPP technical specification TS29.510h00 section 6.2.6.2.3 documents the NFProfile datastructure returned in the NF Discovery responses and suggests to use interPlmnFqdn only for inter PLMN discovery request. Such (inter-PLMN) discovery is done by V-SEPP and not by H-SEPP. The resolution of inter PLMN FQDN at H-SEPP remains a challenge. In particular, the specification states:

If the requester-plmn in the query parameter is different from the PLMN of the discovered NF, then the fqdn attribute value shall contain the interPlmnFqdn value registered by the NF during NF registration (see clause 6.1.6.2.2). The requester-plmn is different from the PLMN of the discovered NF if it belongs to none of the PLMN ID(s) configured for the PLMN of the NRF.

SEPP 126 can be implemented by at least one processor and configured for resolution of inter-network domain names between telecommunications networks. SEPP 126 can be configured for storing a mapping between a domain name and a network address of a producer network function of the home network;

receiving a request message from a consumer network function of a visitor network; and resolving a request message domain name of the request message using the mapping between the domain name and the network address of the producer network function of the home network.

In some examples, the home network lacks a dedicated domain name service, and resolving the request message domain name includes resolving the request message domain name without accessing a domain name server.

In some examples, storing the mapping between the domain name and the network address of the producer network function includes storing the mapping while acting as a proxy between the home network and the visitor network.

Acting as a proxy between the home network and the visitor network can include receiving a discovery request from the consumer network function, forwarding the discovery request to a network function repository function (NRF), receiving a response message from the NRF, and forwarding the response message to the consumer network function. Storing the mapping between the domain name and the network address of the producer network function includes extracting the network address and domain name from the response message from the NRF.

In some examples, storing the mapping between the domain name and the network address of the producer network function includes storing other topology information from a network function repository function (NRF), and resolving the request message domain name of the request message includes using the other topology information. Storing other topology information from the NRF can include extracting the other topology information from a subscription/notification request. Storing other topology information from the NRF can include extracting the other topology information from a network function management query.

In some examples, SEPP 126 is configured for forwarding the request message to the producer network function using the network address, receiving a response message from the producer network function, and forwarding the response message to the consumer network function. The home network can be a 5G network and the request message can be a 5G service based interface (SBI) message.

Figure 2:
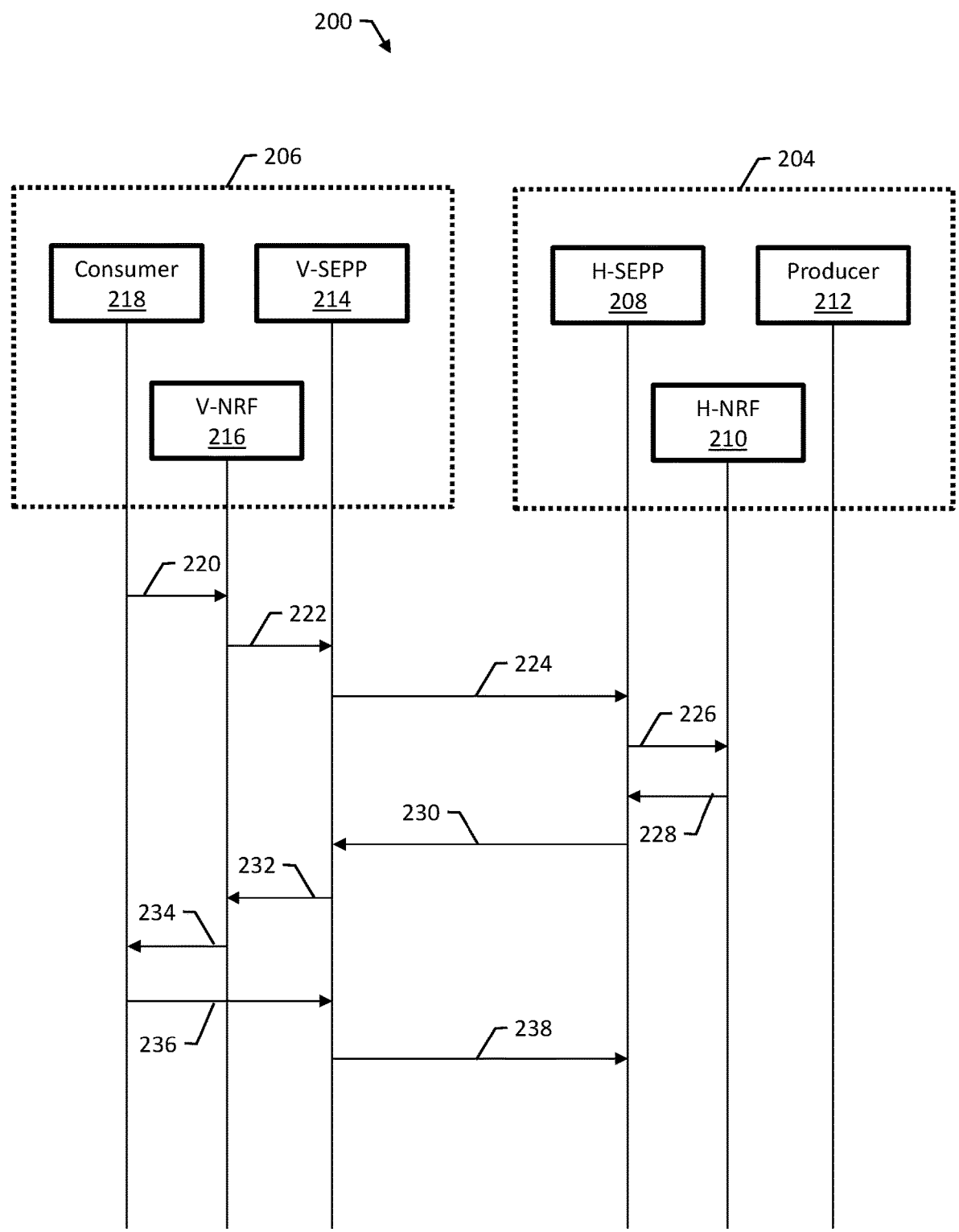
FIG. 2 is a message flow diagram illustrating an example scenario where a routing failure occurs in a home network for a discovery request from a visitor network.

FIG. 2 is a message flow diagram illustrating an example scenario 200 where a routing failure occurs in a home network 204 for a discovery request from a visitor network 206.

Inter PLMN FQDN is mandated for inter PLMN routing; however, no such restriction is made for intra PLMN routing. The operator of home network 204 has decided to configure home network 204 such that home network 204 lacks a dedicated domain name service.

Networks, such as home network 204, which do not support inter PLMN FQDN resolution to IP using DNS cannot support inter-PLMN traffic as H-SEPP cannot resolve/route to the FQDN received in the 5G SBI request. A local configuration of inter-PLMN FQDN to IP mapping via DNS or other means can be cumbersome and can present an operational challenge to keep up with always changing 5G topology.

Home network 204 includes an H-SEPP 208, an H-NRF 210, and a producer network function 212. Visitor network 206 includes a V-SEPP 214, a V-NRF 216, and a consumer network function 218.

Consumer network function 218 sends a discovery request message 220 to V-NRF 216. V-NRF 216 forwards the discovery request message 222 to V-SEPP 214. V-SEPP 214 forwards the discovery request message 224 to H-SEPP 208. H-SEPP 208 forwards the discovery request message 226 to H-NRF 210.

H-NRF 210 sends a discovery response message 228 to H-SEPP 208. The discovery response message 228 identifies producer network function 212. H-SEPP 208 forwards the discovery response message 230 to V-SEPP 214. V-SEPP 214 forwards the discovery response message 232 to V-NRF 216. V-NRF 216 forwards the discovery response message 234 to the consumer network function 218.

Consumer network function 218 sends a 5G SBI request message 236 to V-SEPP 214 and addressed to producer network function 212. V-SEPP 214 forwards the 5G SBI request message 238 to H-SEPP 208. Due to the requirement for using an Inter-PLMN FQDN, H-SEPP 208 will need to resolve the domain name of the 5G SBI request message 238. Since home network 204 lacks a domain name service to provide a mapping between the domain name and the IP address of producer network function 212, H-SEPP 208 will be unable to route 5G SBI request 238.

Figure 3:
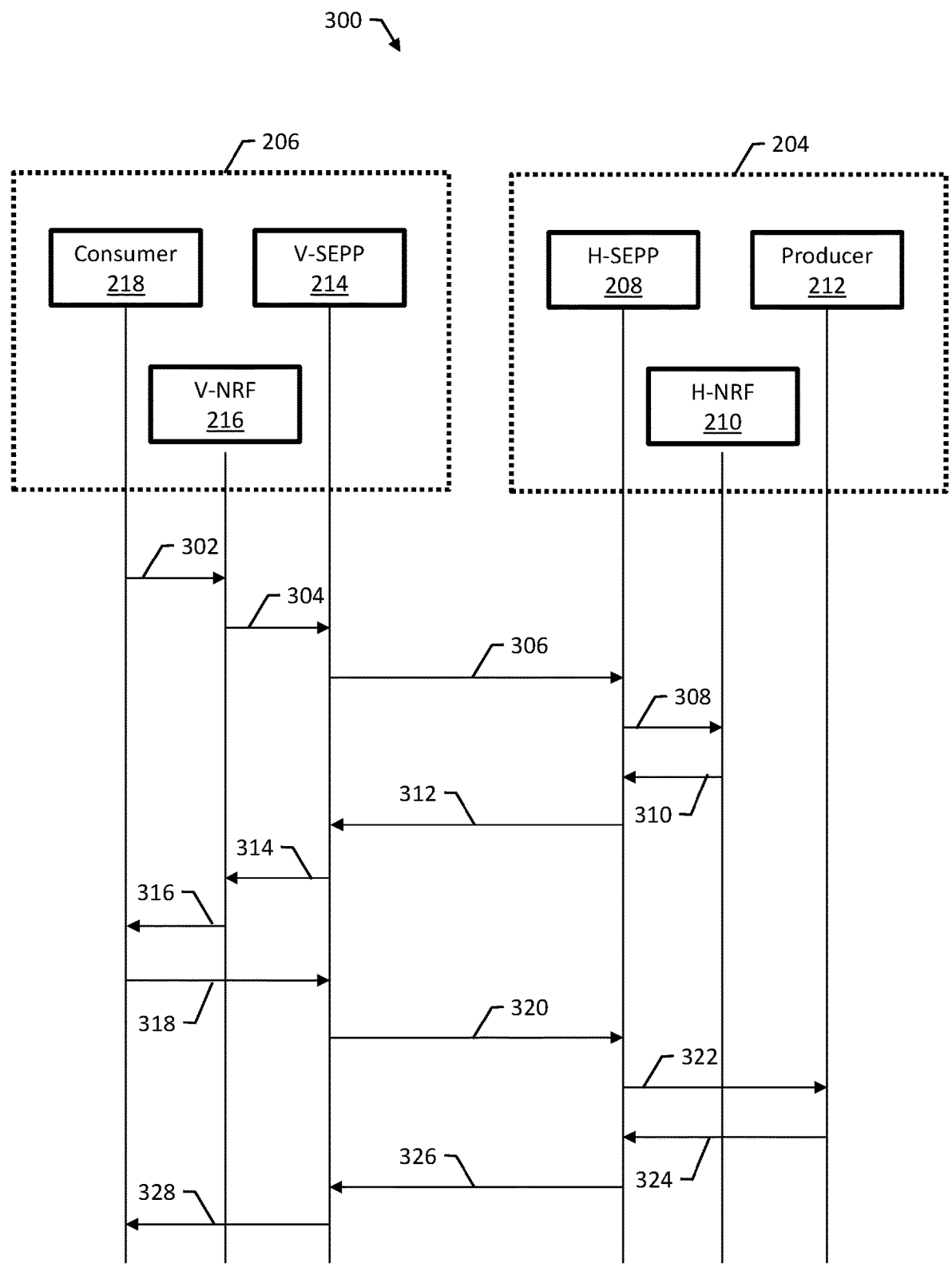
FIG. 3 is a message flow diagram illustrating an example scenario where the home SEPP is configured for resolution of inter-network domain names between telecommunications networks.

FIG. 3 is a message flow diagram illustrating an example scenario 300 where the home SEPP is configured for resolution of inter-network domain names between telecommunications networks. H-SEPP 208 is configured for storing a mapping between a domain name and a network address of a producer network function of the home network; receiving a request message from a consumer network function of a visitor network; and resolving a request message domain name of the request message using the mapping between the domain name and the network address of the producer network function of the home network.

Consumer network function 218 sends a discovery request message 302 to V-NRF 216. V-NRF 216 forwards the discovery request message 304 to V-SEPP 214. V-SEPP 214 forwards the discovery request message 306 to H-SEPP 208. H-SEPP 208 forwards the discovery request message 308 to H-NRF 210.

H-NRF 210 sends a discovery response message 310 to H-SEPP 208. The discovery response message 310 identifies producer network function 212. H-SEPP 208 forwards the discovery response message 230 to V-SEPP 214.

By forwarding the discovery request message 308 to H-NRF 210 and the discovery response message 312 to V-SEPP 214, H-SEPP 208 acts as a proxy between home network 204 and visitor network 206. While acting as a proxy between home network 204 and visitor network 206, H-SEPP stores the FQDN and IP address of producer network function 212 for later usage. For example, H-SEPP 208 can extract the domain name and network address for producer network function 212 from discovery response message 310.

H-SEPP 208 can store the FQDN and IP address as a mapping between the FQDN and the IP address. H-SEPP 208 can store various mappings between domain names and network addresses in an appropriate data structure, e.g., a table. H-SEPP 208 can then later resolve domain names by looking up the domain names in the table and retrieving the corresponding network address, even though home network 204 lacks a dedicated domain name service.

H-SEPP 208 can store any appropriate NRF request/response information related to topology information to be used later in FQDN resolution. For example, in some cases, H-SEPP 208 can store topology information from subscription/notification messages or management queries or both.

V-SEPP 214 forwards the discovery response message 232 to V-NRF 216. V-NRF 216 forwards the discovery response message 234 to the consumer network function 218.

Consumer network function 218 sends a 5G SBI request message 236 to V-SEPP 214 and addressed to producer network function 212. V-SEPP 214 forwards the 5G SBI request message 238 to H-SEPP 208.

H-SEPP 208 uses the previously stored mapping to resolve the FQDN for the 5G SBI request message 320, e.g., by looking up the FQDN in a table of mappings and retrieving the corresponding IP address. H-SEPP 208 forwards the 5G SBI request 322 to producer network function 212.

Producer network function 212 sends a 5G SBI response message 324 to H-SEPP 208. H-SEPP 208 forwards the 5G SBI response message 326 to V-SEPP 214. V-SEPP 214 forwards the 5G SBI response message 328 to consumer network function 218.

Figure 4:
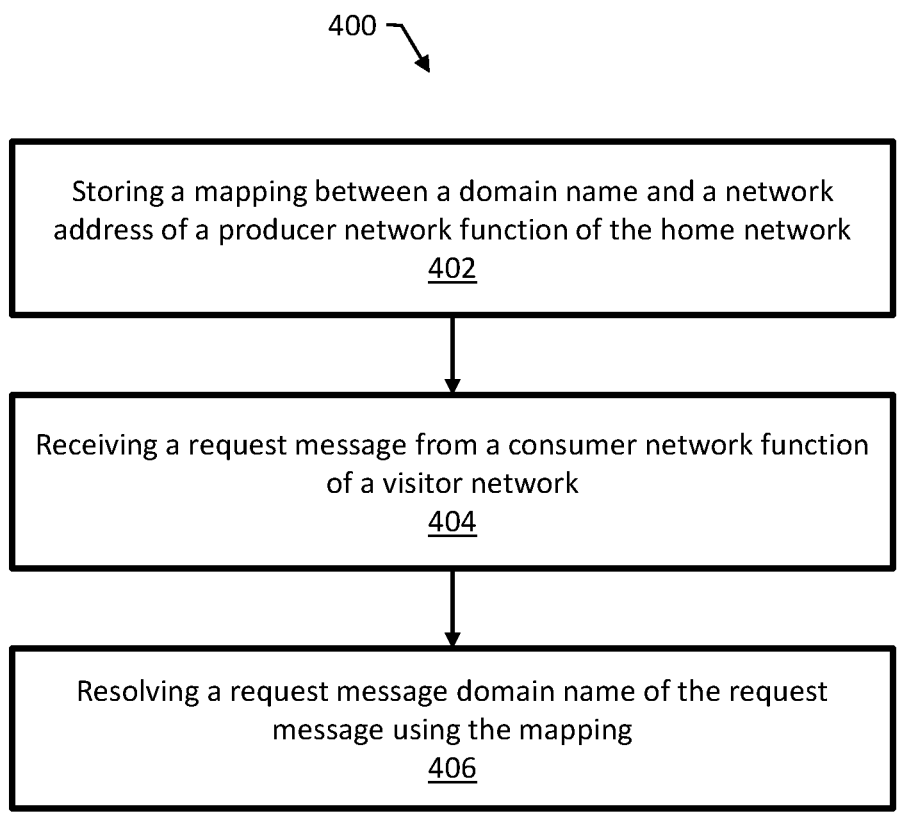
FIG. 4 is a flow diagram of an example method for resolution of inter-network domain names between telecommunications networks.

FIG. 4 is a flow diagram of an example method 400 for resolution of inter-network domain names between telecommunications networks. Method 400 can be performed, e.g., by the SEPP 126 of FIG. 1.

Method 400 includes storing, at a security edge protection proxy (SEPP) of a home network, a mapping between a domain name and a network address of a producer network function of the home network (402). Method 400 includes receiving, at the SEPP of the home network, a request message from a consumer network function of a visitor network (404). Method 400 includes resolving, at the SEPP of the home network, a request message domain name of the request message using the mapping between the domain name and the network address of the producer network function of the home network (406).

In some examples, the home network lacks a dedicated domain name service, and resolving the request message domain name includes resolving the request message domain name without accessing a domain name server.

In some examples, storing the mapping between the domain name and the network address of the producer network function includes storing the mapping while acting as a proxy between the home network and the visitor network.

Acting as a proxy between the home network and the visitor network can include receiving a discovery request from the consumer network function, forwarding the discovery request to a network function repository function (NRF), receiving a response message from the NRF, and forwarding the response message to the consumer network function. Storing the mapping between the domain name and the network address of the producer network function includes extracting the network address and domain name from the response message from the NRF.

In some examples, storing the mapping between the domain name and the network address of the producer network function includes storing other topology information from a network function repository function (NRF), and resolving the request message domain name of the request message includes using the other topology information. Storing other topology information from the NRF can include extracting the other topology information from a subscription/notification request. Storing other topology information from the NRF can include extracting the other topology information from a network function management query.

In some examples, method 400 includes forwarding the request message to the producer network function using the network address, receiving a response message from the producer network function, and forwarding the response message to the consumer network function. The home network can be a 5G network and the request message can be a 5G service based interface (SBI) message.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for resolution of inter-network domain names between telecommunications networks, the method comprising:

storing, at a security edge protection proxy (SEPP) of a home network, a mapping between a domain name and a network address of a producer network function of the home network;

receiving, at the SEPP of the home network, a request message from a consumer network function of a visitor network; and resolving, at the SEPP of the home network, a request message domain name of the request message using the mapping between the domain name and the network address of the producer network function of the home network;

wherein storing the mapping between the domain name and the network address of the producer network function comprises storing the mapping while acting as a proxy between the home network and the visitor network; and wherein acting as a proxy between the home network and the visitor network comprises receiving a discovery request from the consumer network function, forwarding the discovery request to a network function repository function (NRF), receiving a response message from the NRF, and forwarding the response message to the consumer network function.

2. The method of claim 1, wherein the home network lacks a dedicated domain name service, and wherein resolving the request message domain name comprises resolving the request message domain name without accessing a domain name server.

3. The method of claim 1, wherein storing the mapping between the domain name and the network address of the producer network function comprises extracting the network address and domain name from the response message from the NRF.

4. The method of claim 1, wherein storing the mapping between the domain name and the network address of the producer network function comprises storing topology information from a network function repository function (NRF), and wherein resolving the request message domain name of the request message comprises using the topology information.

5. The method of claim 4, wherein storing topology information from the NRF comprises extracting the topology information from a subscription/notification request.

6. The method of claim 4, wherein storing topology information from the NRF comprises extracting the topology information from a network function management query.

7. The method of claim 1, comprising forwarding the request message to the producer network function using the network address, receiving a response message from the producer network function, and forwarding the response message to the consumer network function.

8. The method of claim 1, wherein the home network is a 5G network and the request message is a 5G service based interface (SBI) message.

9. A system for resolution of inter-network domain names between telecommunications networks, the system comprising:

at least one processor and a memory; and a security edge protection proxy (SEPP) of a home network, the SEPP implemented by the at least one processor and configured for:

storing a mapping between a domain name and a network address of a producer network function of the home network;

receiving a request message from a consumer network function of a visitor network; and resolving a request message domain name of the request message using the mapping between the domain name and the network address of the producer network function of the home network;

wherein storing the mapping between the domain name and the network address of the producer network function comprises storing the mapping while acting as a proxy between the home network and the visitor network; and wherein acting as a proxy between the home network and the visitor network comprises receiving a discovery request from the consumer network function, forwarding the discovery request to a network function repository function (NRF), receiving a response message from the NRF, and forwarding the response message to the consumer network function.

10. The system of claim 9, wherein the home network lacks a dedicated domain name service, and wherein resolving the request message domain name comprises resolving the request message domain name without accessing a domain name server.

11. The system of claim 9, wherein storing the mapping between the domain name and the network address of the producer network function comprises extracting the network address and domain name from the response message from the NRF.

12. The system of claim 9, wherein storing the mapping between the domain name and the network address of the producer network function comprises storing topology information from a network function repository function (NRF), and wherein resolving a request message domain name of the request message comprises using the topology information.

13. The system of claim 12, wherein storing topology information from the NRF comprises extracting the topology information from a subscription/notification request.

14. The system of claim 12, wherein storing topology information from the NRF comprises extracting the topology information from a network function management query.

15. The system of claim 9, wherein the SEPP is configured for forwarding the request message to the producer network function using the network address, receiving a response message from the producer network function, and forwarding the response message to the consumer network function.

16. A non-transitory computer readable medium having stored thereon executable instructions that when executed by a processor of a computer control the computer to perform steps comprising:

storing, at a security edge protection proxy (SEPP) of a home network, a mapping between a domain name and a network address of a producer network function of the home network;

receiving, at the SEPP of the home network, a request message from a consumer network function of a visitor network; and resolving, at the SEPP of the home network, a request message domain name of the request message using the mapping between the domain name and the network address of the producer network function of the home network;

wherein storing the mapping between the domain name and the network address of the producer network function comprises storing the mapping while acting as a proxy between the home network and the visitor network; and wherein acting as a proxy between the home network and the visitor network comprises receiving a discovery request from the consumer network function, forwarding the discovery request to a network function repository function (NRF), receiving a response message from the NRF, and forwarding the response message to the consumer network function.

\* \* \* \* \*

UNITED STATES PATENT AND TRADEMARK OFFICE
CERTIFICATE OF CORRECTION

PATENT NO. : 11,895,080 B2
APPLICATION NO. : 17/356451
DATED : February 6, 2024
INVENTOR(S) : Rajput et al.

It is certified that error appears in the above-identified patent and that said Letters Patent is hereby corrected as shown below:

In the Specification

In Column 6, Lines 46-50, delete "receiving a request message from a consumer network function of a visitor network; and resolving a request message domain name of the request message using the mapping between the domain name and the network address of the producer network function of the home network." and insert the same on Column 6, Line 45, as a continuation of the same paragraph.

Signed and Sealed this
Fourteenth Day of May, 2024

Katherine Kelly Vidal
*Director of the United States Patent and Trademark Office*